March 6, 1951  F. ELLWEIN  2,544,145
ANIMAL TRAP
Filed Oct. 12, 1948
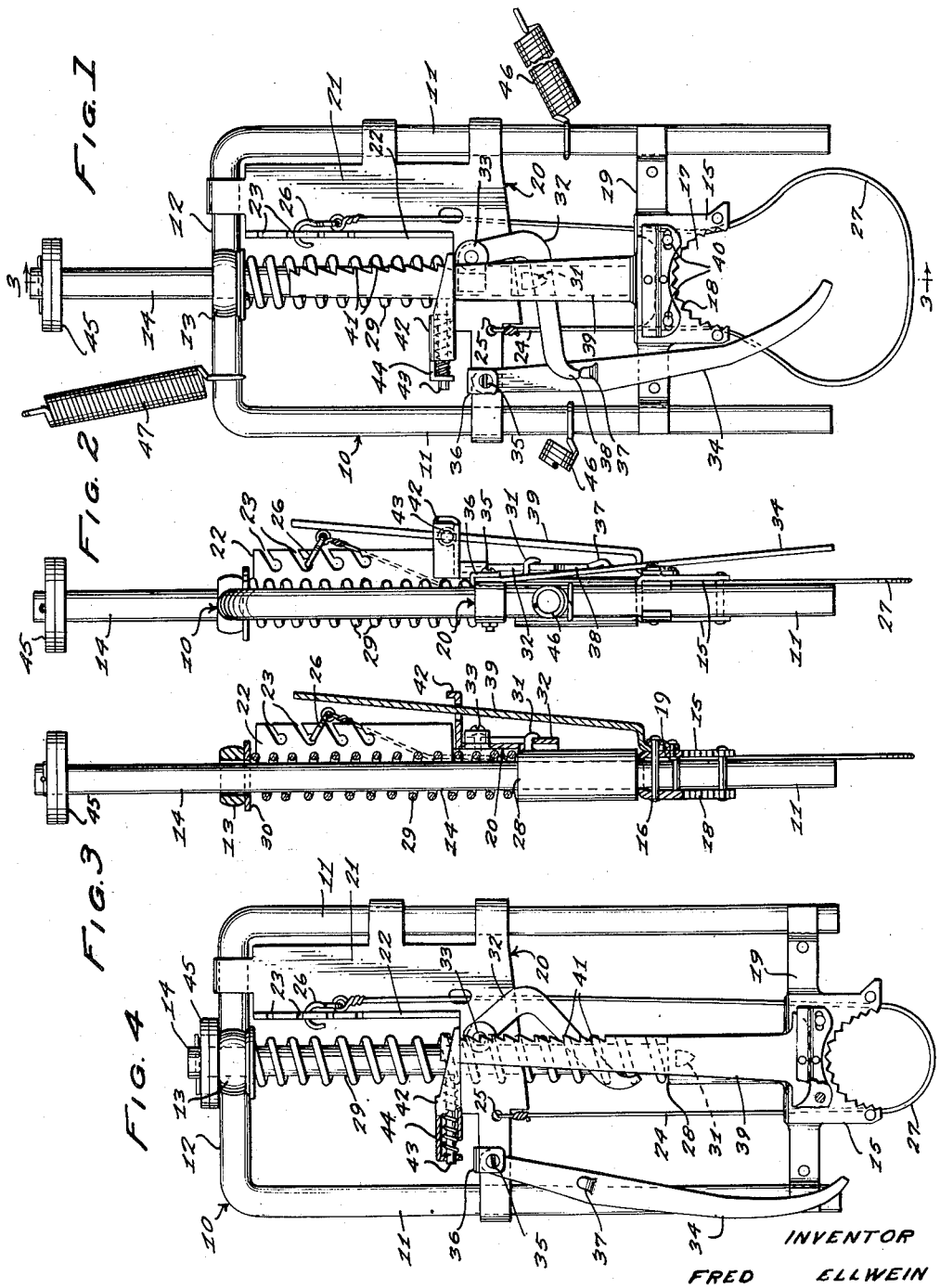
INVENTOR
FRED ELLWEIN
BY
McMorrow, Berman & Davidson
ATTORNEYS

Patented Mar. 6, 1951

2,544,145

UNITED STATES PATENT OFFICE 2,544,145

ANIMAL TRAP

Fred Ellwein, Sidney, Mont.

Application October 12, 1948, Serial No. 54,126

1 Claim. (Cl. 43—87)

This invention relates to animal traps, and more particularly to an improved snare-type trap which will quickly kill a trapped animal.

It is among the objects of the invention to provide an improved animal trap which is fully effective, regardless of the direction of approach of the animal to the trap, which provides no noticeable obstruction in the path of an animal, and may be well hidden when used in trapping certain kinds of animals, such as mink and otter, which is easy to place and set, which will quickly kill an animal trapped therein to render the trapping of such animals more humane and prevent loss of catches and damage to pelts frequently occasioned by the struggles of trapped animals, and which is simple and durable in construction, and economical to manufacture.

Other objects and advantages will become apparent from a consideration of the following description and the appended claim in conjunction with the accompanying drawing, wherein:

Figure 1 is a front elevation of a trap illustrative of the invention, showing the trap in set condition;

Figure 2 is a side or edge elevation of the trap illustrated in Figure 1;

Figure 3 is a longitudinal, medial cross-section taken substantially on the line 3—3 of Figure 1; and Figure 4 is a front elevation similar to Figure 1 showing the trap in tripped condition.

With continued reference to the drawing, the trap comprises a U-shaped frame, generally indicated at 10, adapted to be mounted in upright position with its lower end at the bottom. This frame includes a pair of substantially straight, parallel legs 11 disposed substantially perpendicularly to a bight 12 having at its mid-length location an apertured eye 13. The entire frame may be formed from a single piece of metal rod bent to substantially rectangular shape with one end left open.

A plunger 14 is slidably received in the aperture of the eye 13 and is disposed substantially parallel to the frame legs 11. An animal-engaging device is secured to the lower end of this plunger and comprises a pair of plates 15 secured to the plunger near the lower end of the latter by suitable means, such as the rivet 16, and disposed in spaced-apart, substantially parallel relationship with each other. Each of these plates has in its lower edge a substantially semi-circular recess 17 opening to the lower edge of the plate and serrated around its edge to provide teeth 18. The recesses 17 are substantially in registry with each other and are of a size to receive the neck of an animal to be trapped. A guide-bar 19 is secured at its mid-length location to the lower end portion of plunger 14 and slidably embraces the frame legs 11 at its ends to guide the plunger in the frame, and a plate, generally indicated at 20, extends across the frame between the guide-bar 19 and the bight 12 and is secured at its opposite ends to the corresponding frame legs 11. This plate has a portion 21 which extends along one of the legs 11 toward the bight 12, and is provided along its edge remote from the corresponding leg 11 with an outwardly-turned flange 22 in which is provided a series of spaced-apart notches 23. A flexible strand 24 is secured to the plate 20 at the side of the plunger opposite the plate portion 21 by suitable means, as by being looped through an aperture 25 in the plate, and is secured at its other end to a hook 26 which is selectively engageable in the notches 23. This strand extends between the plates 15 near the opposite ends of the plates to provide, below these plates, a snare or noose 27 to be drawn about the throat of an animal when the trap is sprung. The size of the noose 27 may be varied by engaging the hook 26 in one or another of the notches 23.

Plunger 14 is provided near its lower end with an annular shoulder 28 and a coiled compression spring 29 surrounds the plunger between this shoulder and an abutment washer 30 bearing against the underside of the eye 13 of the frame to resiliently force the plunger downwardly relative to the frame.

A hooked detent 31 projects outwardly from the plunger near the shoulder 28 and an L-shaped latch-bar 32 is pivoted at one end to the plate 20, as indicated at 33, and is engageable beneath the detent 31 to hold the plunger in spring-compressing position, as is particularly illustrated in Figure 1.

A trigger 34 is pivotally mounted at one end to the plate 20 at the opposite side of the plunger from the pivotal mounting 33 of the latch-bar 32 by means of a pivot screw 35 extending through an apertured tongue 36 bent over from the bar 20 and through a registering aperture in the bar. The free end of this trigger is disposed at one side of the noose 27 and extends within the area of the noose, when the trap is set, as illustrated in Figure 1. A stop 37 is provided on the trigger intermediate the length thereof to engage the free end 38 of the latch-bar 32 to releasably hold the latch-bar in position to retain the plunger with the spring 29 under compression.

When an animal strikes the free lower end of the trigger and moves the stop 37 from under the free end of the latch-bar 32, this latch-bar is swung about its pivotal connection 33 releasing the plunger which is forced downwardly by the compression spring 29, tightening the noose 27 about the neck of the animal to the condition illustrated in Figure 4.

A locking bolt 39 is secured to one of the plates 15 at the lower end of the plunger by a pair of rivets 40 extending through elongated apertures in the widened lower end of the locking bolt, and is provided along one edge with teeth 41 near its upper end. This locking bolt extends through the aperture of an apertured keeper 42 carried by the plate 20 and the teeth 41 are engageable with the keeper to maintain the plunger in its lowered position after the trap has been sprung. The locking bolt is resiliently urged to tooth-engaging position relative to the keeper by a plunger 43 carried by the keeper 42 and urged into contact with the locking bolt 39 by a compression spring 44. A trapped animal is thus unable to lift the plunger 14 to disengage its head from the noose once the trap has been sprung.

A stop-collar 45 is secured on the plunger 14 near its upper end and contacts the bight 12 of the trap frame to limit downward movement of the plunger when the trap is sprung.

A pair of coiled tension springs 46 is secured at one end, one to each of the legs 11 of the trap frame between the guide-bar 19 and the plate 20 to provide means for securing the trap in operative position to the face of a bank containing an animal den or burrow, or to a building wall or other support, and a third spring 47 may also be attached to the bight 12 of the frame for this purpose, if desired.

When the trap is properly positioned, the noose 27 is concealed in the ground or positioned below the hole or burrow used by the animal and the only portion of the trap visible to the animal is a small part of the free end of the trigger 34 and this may be suitably camouflaged with some object environmental to the location of the trap. The main portion of the trap is positioned above the animal hole or burrow, or above a pathway used by the animal and, in most cases, may be substantially concealed so that its presence will not be readily detected by the animal. Once the trap has been sprung by an animal inserting its head through the trap noose, the animal is quickly killed without damage to the pelt.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

An animal trap comprising a U-shaped frame adapted to be mounted in upright position with its lower end at the bottom and having an aperture through its bight portion substantially at the mid-length location of the latter, a plunger slidable in said aperture and disposed substantially parallel to the legs of said U-shaped frame, a guide-bar on the lower end of said plunger slidably engaging the legs of said frame, animal-engaging means on the lower end of said plunger, a plate extending transversely of said frame between said guide-bar and said frame bight and having a portion extending along one of the frame legs toward said bight and provided with spaced-apart notches, a strand secured at one end to said plate and at its opposite end to a hook selectively engageable in said notches, said strand extending through said animal-engaging means near each end of the latter to provide a noose disposed below said animal-engaging means, a shoulder on said plunger, a compression spring interposed between said shoulder and the bight of said frame to resiliently force said plunger downwardly, a detent on said plunger, a latch-bar pivotally secured at one end to said plate and engageable with said detent to hold said plunger in position with said spring compressed, a trigger pivotally connected at one end to said plate and having a stop engageable with the free end of said latch-bar to releasably hold said latch-bar in plunger-retaining position, the free end of said trigger being positioned at one side of said noose and extending within the area of said noose when said trap is set, an apertured keeper on said plate, a toothed locking bolt secured at its lower end to the lower end of said plunger and extending through said keeper for engagement with the latter to releasably lock said plunger in spring-expanded position, resilient means carried by said keeper and engaging said bolt to urge the teeth of said bolt in operative engagement with said keeper, and a stop-collar secured on said plunger near the upper end of the latter to limit downward movement of said plunger by contact of said collar with the bight of said frame.

FRED ELLWEIN.

REFERENCES CITED

The following references are of record in the file of this patent:

UNITED STATES PATENTS

| Number | Name | Date |
|---|---|---|
| 238,583 | Hales | Mar. 8, 1881 |
| 374,135 | Wood | Nov. 29, 1887 |
| 674,551 | Carlsen | May 21, 1901 |
| 1,330,622 | Corsaw | Feb. 10, 1920 |
| 2,479,196 | Anderson | Aug. 16, 1949 |

FOREIGN PATENTS

| Number | Country | Date |
|---|---|---|
| 124,601 | Germany | Oct. 15, 1901 |
| 432,752 | Great Britain | Aug. 1, 1935 |